United States Patent

Sowa

[11] Patent Number: 5,352,506
[45] Date of Patent: Oct. 4, 1994

[54] DIAPHRAGM

[75] Inventor: Nobuhiro Sowa, Kawachinagano, Japan

[73] Assignee: Sumitomo Rubber Industries, Ltd., Kobe, Japan

[21] Appl. No.: 20,403

[22] Filed: Feb. 22, 1993

[30] Foreign Application Priority Data

Feb. 26, 1992 [JP] Japan .................. 4-008657[U]

[51] Int. Cl.$^5$ .................. B32B 7/00; D03D 3/00; G10K 13/00; H04R 7/00
[52] U.S. Cl. .................. 428/225; 428/227; 428/245; 428/250; 428/263; 428/265; 428/258; 428/64; 181/166; 181/167; 181/170
[58] Field of Search .................. 428/225, 245, 250, 263, 428/265; 181/166, 167, 170

[56] References Cited

U.S. PATENT DOCUMENTS

| 5,031,720 | 7/1991 | Ohta et al. | 181/169 |
| 5,217,797 | 6/1993 | Knox et al. | 428/246 |

FOREIGN PATENT DOCUMENTS 2208089  2/1989  United Kingdom .

Primary Examiner—George F. Lesmes
Assistant Examiner—Kathryne E. Shelborne
Attorney, Agent, or Firm—Nikaido, Marmelstein, Murray & Oram

[57] ABSTRACT

The invention is intended to improve the durability and durability of a diaphragm of centrally convex form. A diaphragm comprises a substantially circular woven base fabric (1) formed of warp yarns (1a and 1a') radially extending in centrally convex form from the central region and weft yarns (1b) helically interwoven with the warp yarns (1a), and a rubber member (2) of centrally convex membrane form molded integrally with the base fabric (1).

3 Claims, 3 Drawing Sheet

DIAPHRAGM

BACKGROUND OF THE INVENTION

1. Field of the Invention

The present invention relates to a diaphragm of centrally convex form used where pressure resistance is required.

2. Prior Art

Diaphragms are usually molded of rubber in membrane form and, where pressure resistance is required, they are reinforced by a base fabric of plain weave disposed in the rubber member.

In the case where the diaphragm is of centrally convex form, it has been common practice to mold such diaphragm of centrally convex form by setting a base fabric of plain weave and rubber in a press die or the like, and pressing the assembly.

However, since the base fabric is of plain weave, the warp and weft yarns constituting the portion of the base fabric in and around the centrally convex region are drawn toward the centrally convex region during press molding operation, resulting in variations in the density of warp and weft yarns, wrinkles, overlaps and the like, thus making the pressure-resisting strength nonuniform. As a result, some of the yarns constituting the base fabric are broken prematurely owing to repetitive vibrations, thus degrading the durability.

SUMMARY OF THE INVENTION

As a means for solving said problem, the present invention provides a diaphragm comprising a base fabric formed of warp yarns radially extending in centrally convex form from the central region and weft yarns helically interwoven with said warp yarns, and a rubber member of centrally convex membrane form molded integrally with said base fabric.

Since the warp yarns in the base fabric are radially disposed in centrally convex form and the weft yarns are helically interwoven with said warp yarns, the base fabric has a three-dimensional construction of centrally convex form, and the yarn density does not become varied even in the state where the yarns are molded with rubber, making it possible to eliminate wrinkles or overlaps and maintain a uniform pressure-resisting strength, thus improving the durability.

According to the present invention, the warp yarns of the base fabric radially extend in centrally convex form from the central region and the weft yarns are helically interwoven with the warp yarns, thereby forming a three dimensional base fabric of centrally convex form. Even when this base fabric is molded with rubber, the yarns remain in regular equispaced disposition. And there is no danger of producing wrinkles or overlaps, so that the pressure-resisting strength in the various regions can be made uniform. It has been found that the durability can be greatly increased (about 50-100 times). The density of yarn disposition becomes rational and, as compared with the conventional plain weave, it becomes possible to decrease the number of yarns used by about 10%. Further, since the warp yarns of the base fabric are radially disposed and the weft yarns are helically interwoven with the warp yarns, it becomes possible to construct such base fabrics in three-dimensional form and to mold this type of diaphragm of centrally convex form to have any desired shape which suits the intended purpose.

DESCRIPTION OF THE PREFERRED EMBODIMENTS

Figure 1:
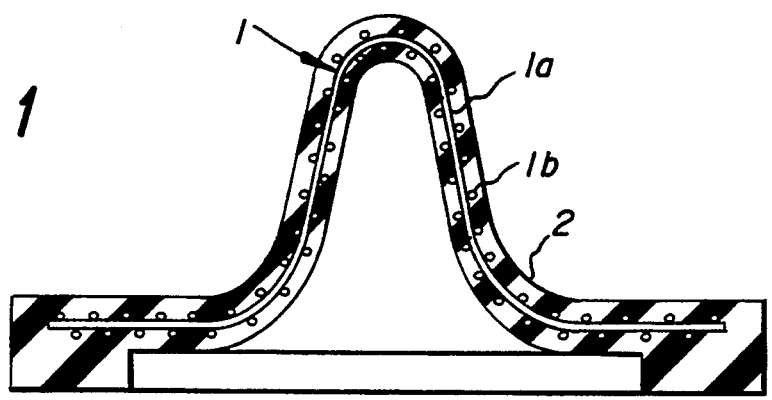
FIG. 1 is a side view in longitudinal section showing a diaphragm according to an embodiment of the present invention.

The present invention will now be described with reference to an embodiment shown in the drawings.

FIG. 1 is a sectional view in longitudinal section showing a diaphragm according to an embodiment of the present invention. The numeral 1 denotes a woven substantially circular base fabric, and 2 denotes a rubber member. In addition, in FIG. 1, the base fabric 1 is shown embedded in the central region of the rubber member 1 in sandwich form. However, it may be disposed on either the front surface or the back surface of the rubber member 2.

Figure 2:
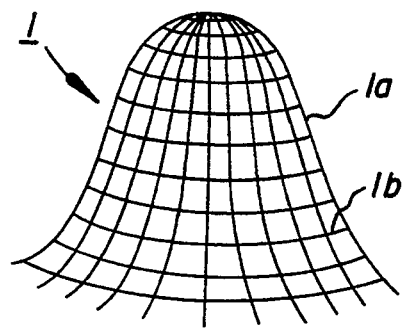
FIG. 2 is a schematic perspective view showing an example of the weave construction of a base fabric to be used in the diaphragm of the invention.
Figure 3:
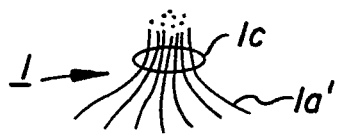
FIG. 3 is a schematic perspective view showing by way of example the tying of the weft yarns in the top of the centrally convex region of the base fabric to be used in the diaphragm of the invention.
Figure 4:
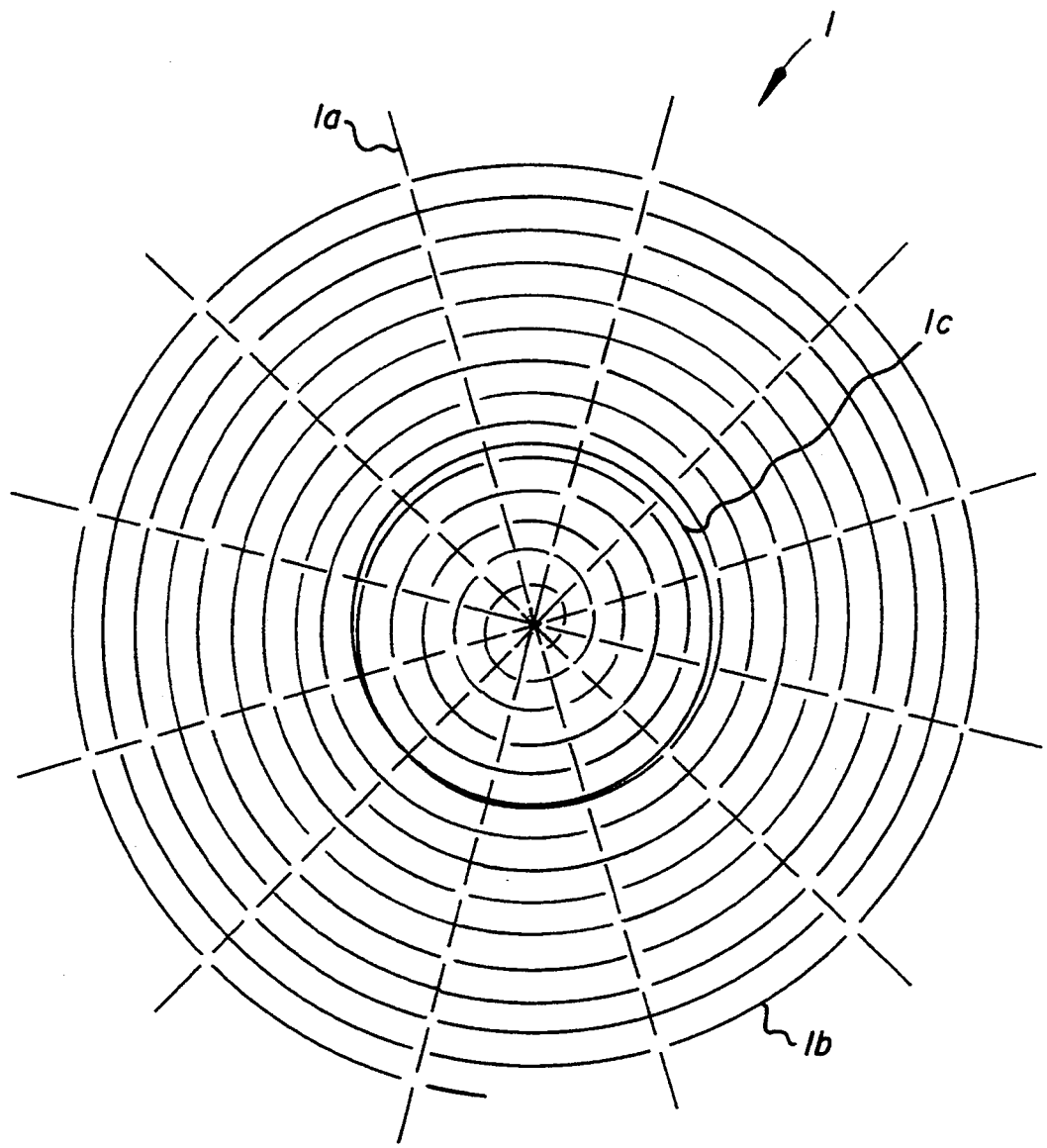
FIG. 4 is a schematic plan view of an example of the weave construction of a base fabric embodying the features shown in FIG. 2.
Figure 5:
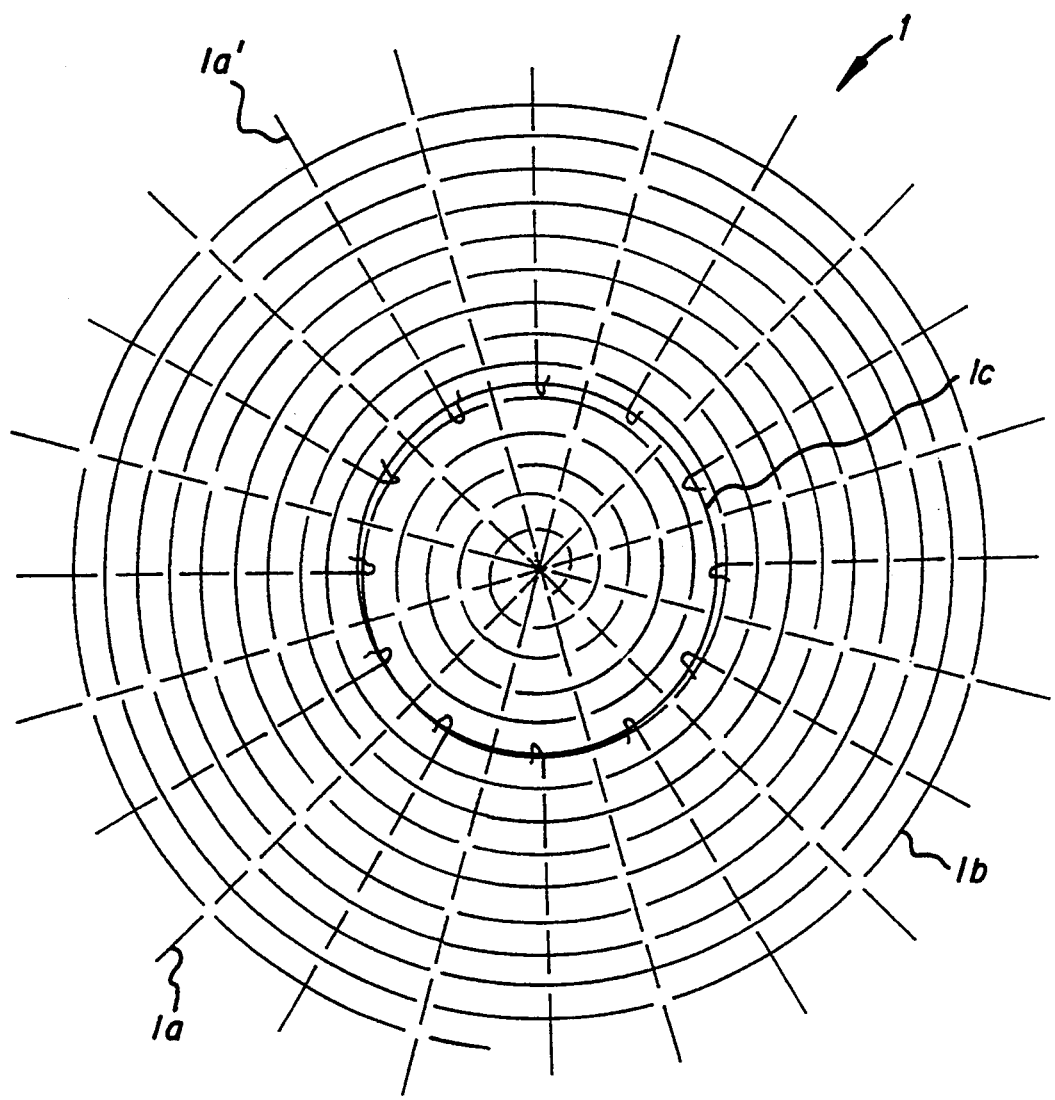
FIG. 5 is a schematic plan view of a base fabric similar to FIG. 4 further including the added warp yarns shown in FIG. 3.

As shown in FIGS. 2 and 4 the base fabric 1 consists of warp yarns $1a$ and weft yarns $1b$, wherein said warp yarns $1a$ radially extend in centrally convex form from the central region said weft yarns $1b$ being helically interwoven with said warp yarns $1a$. In addition, the warp yarns $1a$ may be arranged so that they increase in number by adding yarns $1a$ to outwardly from intermediate region to the lower outward skirt as shown in FIG. 5. Further, as shown in FIG. 3, some of the warp yarns $1a$ may be tied together in the intermediate region by a tying string $1c$. Warp yarns $1a$ may radially extend in centrally convex form from the central of the diaphragm as shown in FIG. 2 and the other yarns $1a'$ may be tied together in the intermediate region as shown in FIG. 3. FIG. 5 shows this combined arrangement.

There is no limitation on the fiber used for the warp and weft yarns $1a$, $1b$; any fiber may be used. As for the thickness of yarns and weave density, they may be suitably selected according to uses.

The means for making the base fabric 1 forms no portion of the present invention, and it may be formed radially disposing the warp yarns $1a$ in centrally convex form, winding the weft yarns $1b$ helically from the upper middle region to the lower outward skirt region, during which every other or few weft yarns $1a$ are moved in the warp direction so as to effect the shedding motion as in the case of plain weave.

The shape and size of the base fabric 1 are selected according to the intended shape of the diaphragm.

The base fabric 1 together with a rubber material is set in a press die or the like which suits the intended shape and then press-molded to provide a diaphragm of intended shape.

In the diaphragm of the present invention thus produced, the warp yarns $1a$ and $1a'$ of the base fabric 1 are radially regularly disposed at equal intervals and the weft yarns 1b are helically interwoven with the warp yarns; therefore, in contrast to the membrane form of the diaphragm, the pressure-resisting strength in the various circumferential regions is uniform.

What is claimed is:

1. A diaphragm comprising a woven substantially circular base fabric formed of warp yarns radially extending in centrally convex form from the center of the fabric and weft yarns helically interwoven with said warp yarns, and a rubber member of centrally convex membrane form molded integrally with said base fabric.

2. A diaphragm as recited in claim 1 further including additional warp yarns extending outwardly from an intermediate region of said base fabric.

3. A diaphragm as recited in claim 2 wherein said additional warp yarns are tied together in the intermediate region of the base fabric by a tying string.

* * * * *